April 28, 1925.

F. OLDROYD

LOADING MACHINE

Filed Aug. 15, 1923

Inventor
Fred Oldroyd
By Cyrus Kehr
Attorney

April 28, 1925.

F. OLDROYD

LOADING MACHINE

Filed Aug. 15, 1923

Inventor
Fred Oldroyd
By Cyrus Kehr
Attorney

April 28, 1925.

F. OLDROYD

LOADING MACHINE

Filed Aug. 15, 1923

Inventor
Fred Oldroyd
By Cyrus Kehr Attorney

April 28, 1925.　　　　　　　　　　　　　　　　1,535,337
F. OLDROYD
LOADING MACHINE
Filed Aug. 15, 1923　　　5 Sheets-Sheet 5

Inventor
Fred Oldroyd
By Cyrus Kehr
Attorney

Patented Apr. 28, 1925.

1,535,337

UNITED STATES PATENT OFFICE.

FRED OLDROYD, OF CINCINNATI, OHIO.

LOADING MACHINE.

Application filed August 15, 1923. Serial No. 657,599.

*To all whom it may concern:*

Be it known that I, FRED OLDROYD, a citizen of the United States, residing at Cincinnati, in the county of Hamilton and State of Ohio, have invented a new and useful Improvement in Loading Machines, of which the following is a specification, reference being had to the accompanying drawing.

My improvement relates particularly to loading machines which are portable and adapted to be moved relative to the mass of material which is to be loaded and which machine comprises a supporting body and a conveyor structure and means at the front of the conveyor for taking material from the mass to be loaded and delivering said material to the conveyor.

The object of the invention is to produce for such a machine a conveyor and means for delivering material to the conveyor, such means being in a form adapted to handle materials of both small and large sizes and adapted to endure large strains and to have ample durability.

In the form herein described, the mechanism is adapted for loading coal in coal mines; but the mechanism may also be used for loading any similar material.

In the accompanying drawings.

Referring first to Figs. 1 to 11, inclusive, the conveyor has side members, A, A, and a floor, $A^1$, extending from one side member to the other. At its upper end the conveyor has a roller, $A^2$, and at its forward or lower end it has a roller, $A^3$. An endless apron or belt, $A^4$, extends around the rollers and over and under the floor and serves in the usual way to carry material delivered upon the lower end of said apron, the carrying by the apron being from the lower end to and over the upper end.

On the front of the conveyor frame is supported a rotary structure which takes material which is to be loaded and carries said material rearward and delivers it upon the lower part of the conveyor. Said rotary structure is rotated automatically simultaneously with the movement of the conveyor apron; but the speed of the apron is to be fast relative to the delivery of material by the rotary structure, in order that the material received by the apron will be carried away fast enough to avoid excessive accumulation of material on the apron.

For supporting and controlling the rotary structure, a side plate, B, is secured to the front of each side member, A, the rear of each such plate overlapping the outer face of the adjacent side member, A, and being secured to said side member by means of bolts, $B^1$.

On a line which is horizontal and perpendicular to the length of the conveyor frame, the side members, A, have apertures, $A^5$, and the side plates, B, have corresponding apertures, $B^2$. Said apertures together form bearings for the journals of the forward or lower rollers, $A^3$, on a line which is forward of and parallel to the last mentioned line. Each of said side plates has a bearing, $B^3$, for the journals of the rotary structure which will now be described.

The rigid part of the rotary structure comprises two semi-cylindrical members, $B^4$, and two disk-form heads, $B^5$, which are secured to the ends of the members, $B^4$, by means of screws, $B^6$, extending through the head into the adjacent semi-cylindrical members. To aid in making engagement between said heads and said semi-cylindrical members, each head has formed on its inner face a circular recess, $B^7$, which receives corresponding extensions, $B^8$, on the semi-cylindrical members. On the outer face of each of said heads is a hub, $B^9$, and a journal, $B^{10}$, which rests in the adjacent bearing, $B^3$, of the adjacent plate, B.

These four members thus arranged and secured to each other form a cylinder with a journal at each end and with a slot extending entirely through the cylinder along its axis and between said heads. In said slot is a blade member, C, which extends from one head to the other and is slidable transversely to the axis of the cylinder and is of such width as to project a working distance from one side of the slot while at the other side the edge of the blade member is even or approximately even with the adjacent exterior face of the cylinder. This blade member is shifted in said slot during the rotation of the cylinder, each edge of the blade member being made to project out of the slot while said edge is going through the forward part of its orbital path.

On each end of the blade member are two wrists or journals, $C^1$, parallel to and equidistant from the middle, longitudinal line of the blade member. On each of said journals is a small anti-friction roller, $C^2$. At each end of said blade members said rollers are designed for travel in a cam groove, $C^3$, formed on the adjacent inner face of the side plate, B. Said cam grooves are formed to hold the middle line of the blade member forward of the cylinder axis while one of the edges of the blade member is moving through the forward part of its orbital path. To hold the blade member against endwise movement and confine it to parallel movement, one side face of said member is provided with transverse tongues, $C^4$, which are fitted for sliding in corresponding grooves, $C^5$, formed on the inner face of one of the semi-cylindrical members, $B^4$.

Each journal, $B^{10}$, projects through its bearing, $B^3$, and has fixed upon its outer end a sprocket wheel, $C^6$. Each of said wheels is surrounded by a sprocket chain, $C^7$, which also surrounds a corresponding sprocket wheel, $A^6$, on the extended journals of the forward roller, $A^3$, of the conveyor. The sprocket wheels, $C^6$ and $A^6$, are proportioned relative to each other to impart to the rotary structure the desired velocity relative to the velocity of the conveyor apron. The conveyor apron receives motion through the application of power to the upper roller, $A^2$, by any suitable means, as a wheel, $A^7$, mounted on one of the journals of said roller.

The conveyor apron may be of any well known form suited to the carrying of heavy material and to the transmission of power through the lower or forward roller, $A^3$, to the rotary structure.

In the drawings already described, the blade member is shown as being composed of two plates, $C^8$, separated by longitudinal bars, $C^9$, on the ends of which are formed the journals, $C^1$, said plates being secured to said bars by means of screws, $C^{10}$.

Figure 1:
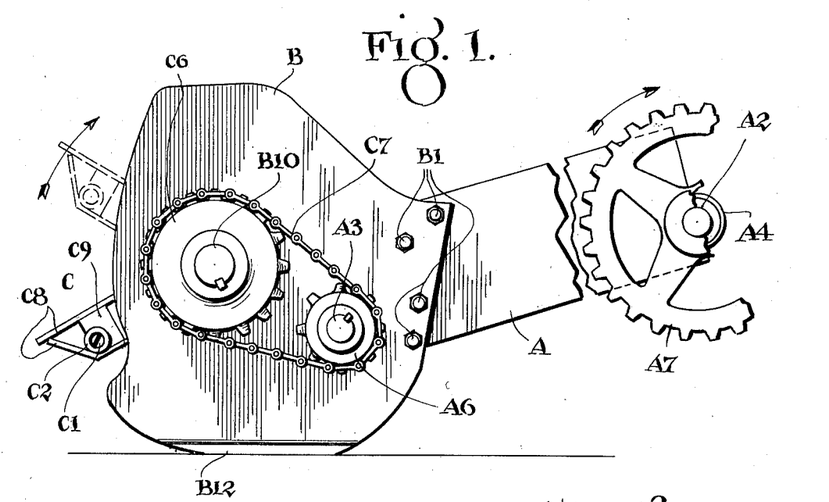
Fig. 1 is a side elevation of a structure embodying my improvement.
Figure 2:
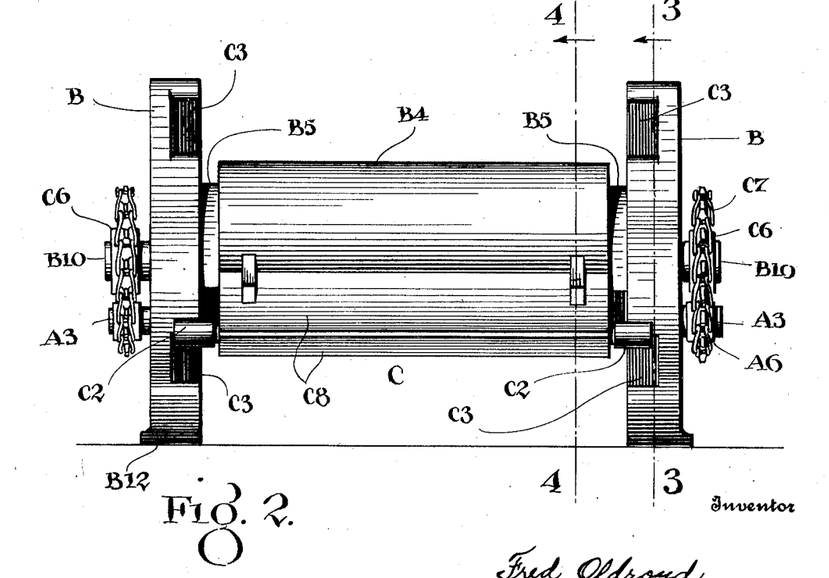
Fig. 2 is a front elevation of the mechanism shown by Fig. 1.
Figure 3:
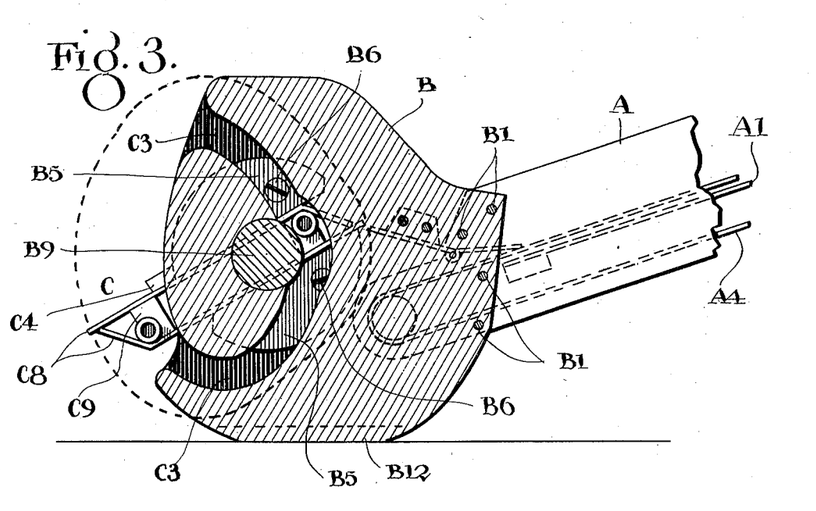
Fig. 3 is an upright section on the line, 3—3, of Fig. 2, looking toward the left.
Figure 4:
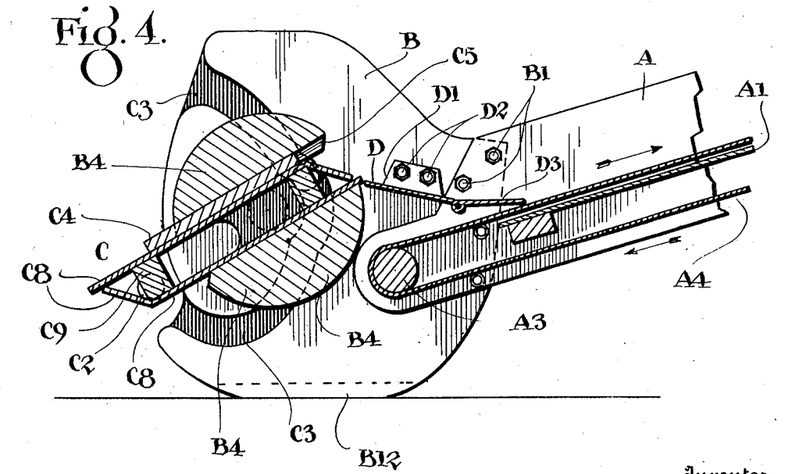
Fig. 4 is an upright section on the line, 4—4, of Fig. 2, looking toward the left.
Figure 5:
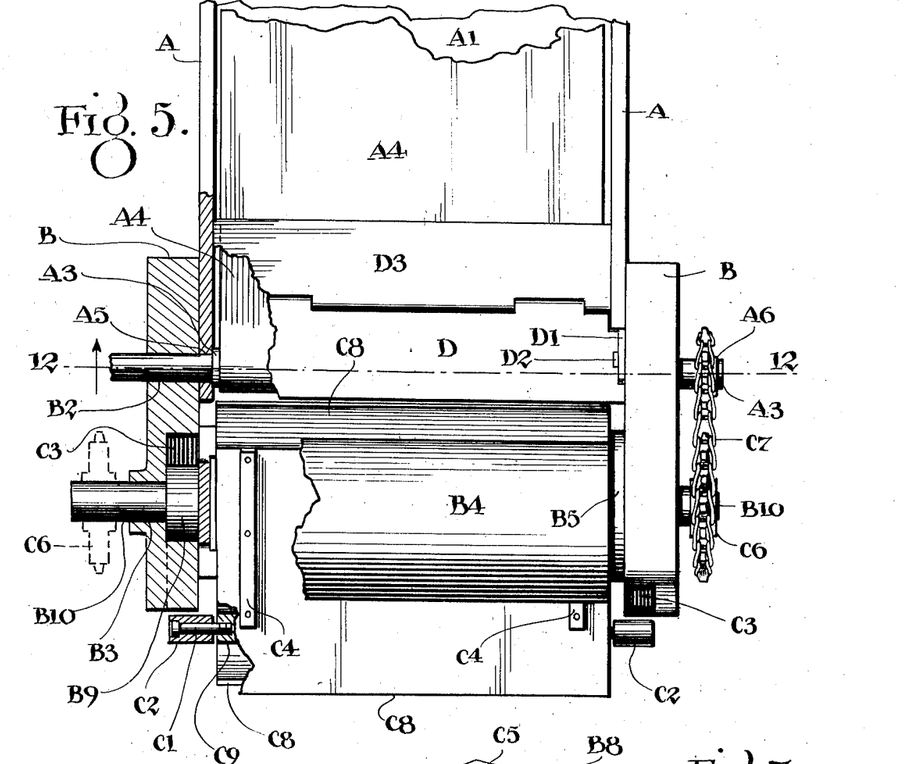
Fig. 5 is a plan of the mechanism shown by Figs. 3 and 4.
Figures 6, 7:
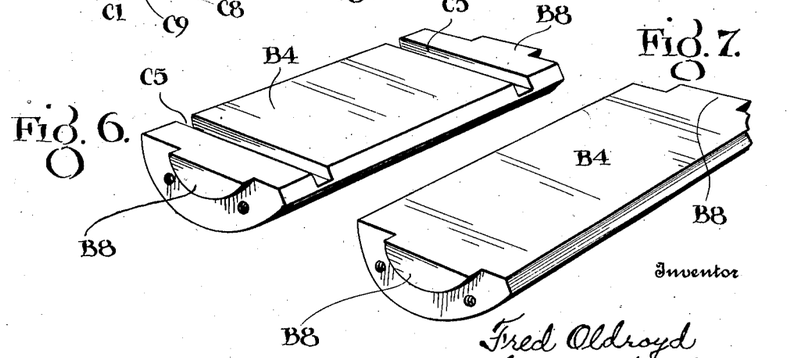
Figs. 6 and 7 are perspective views of two of the members of the rotary structure.
Figures 8, 9, 10, 11:
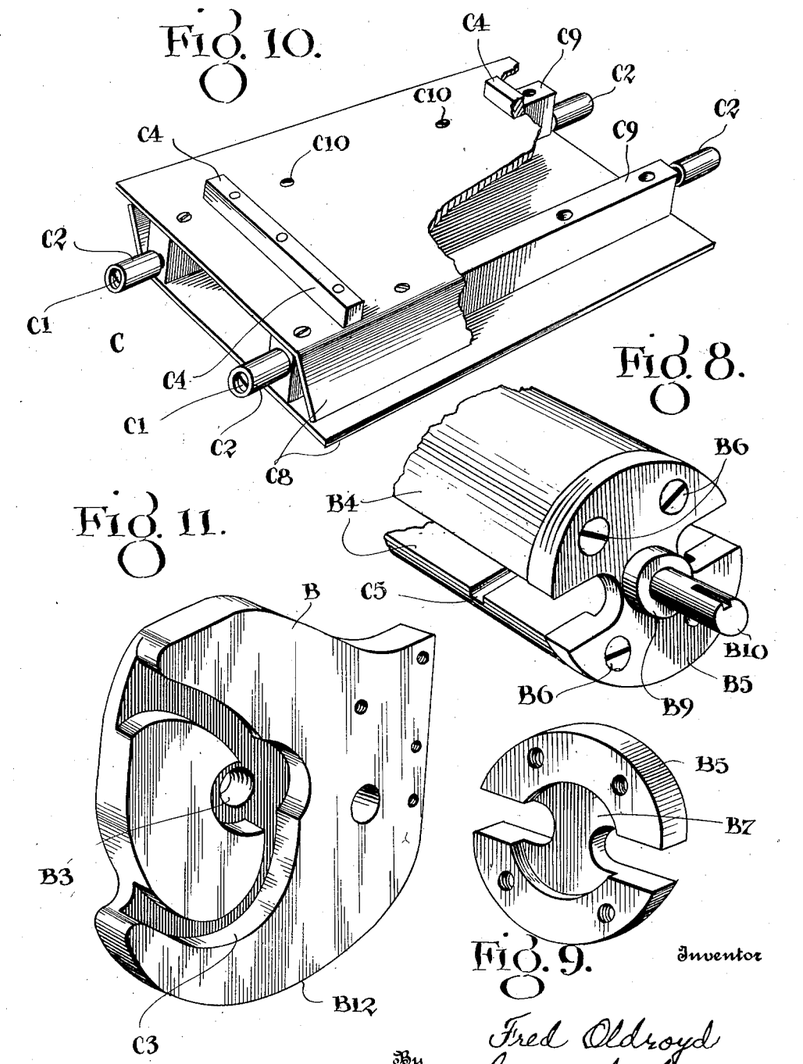
Fig. 8 is a perspective of one end of the rotary structure, the blade member being omitted.
Fig. 9 is a perspective of one of the end discs or heads of the rotary structure.
Fig. 10 is a perspective of the slidable blade member which forms a part of the rotary structure, parts being broken away.
Fig. 11 is a perspective of one of the side plates.
Figure 12:
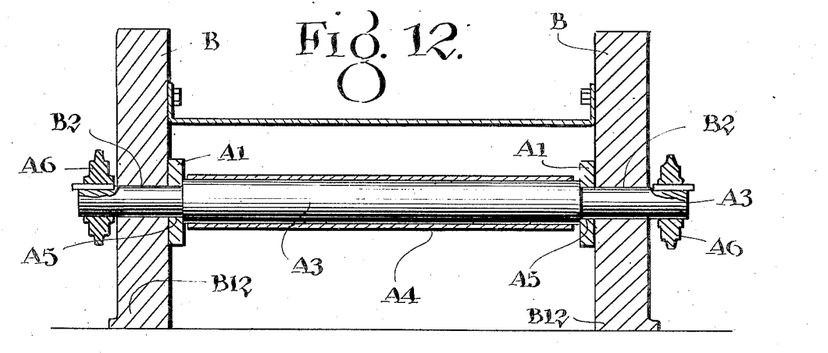
Fig. 12 is an upright, transverse section on the line, 12—12, of Fig. 5.
Figure 13:
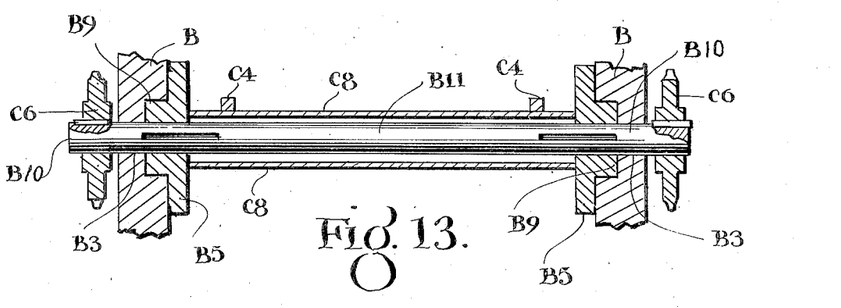
Fig. 13 is an upright section along the axis of the rotary structure and showing the rotary structure in another form.

Thus the blade member is left hollow between said bars and plates. In Fig. 13, the journals, $B^9$, are integral parts of a shaft, $B^{10}$, extending through the heads, $B^5$, and through said hollow part of the blade member, the heads being keyed on the shaft after they have been put into position on the semi-cylindrical members, $B^4$.

Figure 14:
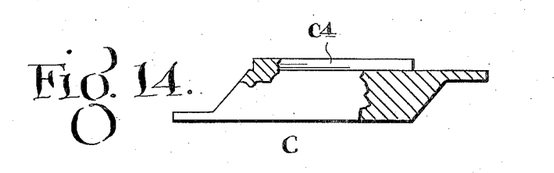
Figs. 14 and 15 show the blade member in other forms.
Figure 15:
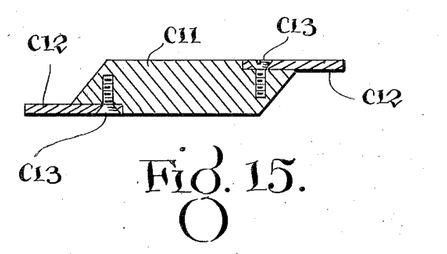

But it is to be understood that the blade member may be made of a single piece, as shown in Fig. 14. In Fig. 15, the blade member is shown as including a body, $C^{11}$, and blades, $C^{12}$, bolted to each edge of the body, $C^{11}$, by bolts, $C^{13}$. Said blades are removable for repairing or substitution of new blades.

It is desirable that, during the rotation of the rotary structure, the forward edge of the blade member will project out of the slot sufficiently to engage and lift material upward and backward over said structure and then retreat into said slot in time to avoid the chute, D. Said chute extends across the forward part of the conveyor and slants downward from front to rear with its upper edge close to the rear face of the cylinder part of the rotary structure and with its lower edge resting close to the conveyor apron.

The ends of the chute are secured to the side plate, A, by means of bolts, $D^2$, extending through said plates and through end flanges, $D^1$, formed on the ends of the chute. To the lower and rear edge of said chute is hinged the forward edge of a floating plate, $D^3$, the rear edge of said plate being free to descend by gravity and rest upon the conveyor apron. Said plate is a means additional to the chute to prevent the coal or other material from moving forward toward the rotary structure, after the material has been deposited upon the apron. It is probable that, for the handling of some kinds of material, the floating plate will not be needed.

The conveyor frame is to be adapted to be supported by a portable body, preferably a body mounted on wheels, whereby the conveyor frame and the rotary structure may be moved forward to a mass of material which is to be loaded. And it will be preferable to so construct said portable body as to allow lateral swinging of the conveyor, in order that the machine may have a lateral range while working.

While this apparatus has been herein described as a loading machine, it is to be understood that it may be used for transferring material from one place to another, instead of delivering it into a vehicle.

In operation, the apron is driven so as to move the upper part of the apron upward and rearward and turn the rotary structure correspondingly, the projecting edge of the blade member moving forward and then upward and then rearward, and during such movement engaging material and carrying it upward and rearward and discharging it upon the chute, D, or imparting sufficient force to the material to cause it to pass above the chute and be deposited directly upon the apron.

Each of the side plates, B, has a lower edge $B^{12}$, adapted to rest and slide upon the floor when the conveyor is moved endwise. This feature is intended especially for functioning to support the forward end of the conveyor when the blade member is bearing upward under a heavy weight of material. This arrangement avoids transmission of such strain from the rotary structure through the conveyor frame to the means by which the rear end of the conveyor frame is supported.

I claim as my invention,

1. In a conveyor structure for machines of the nature described, the combination of means on said structure for conducting material rearward lengthwise on said structure, a rotary structure located at the forward end of the conveyor structure and including a blade member slidable transversely to said structure, and means for sliding said blade member forward during the rotations of the rotary structure, whereby during the upward movement of the forward part of the blade member, said forward part will project for the taking and upward and rearward carrying of material, substantially as described.

2. In a conveyor structure for machines of the nature described, the combination of means on said structure for conducting material rearward lengthwise on said structure, a rotary structure located at the forward end of the conveyor structure and including a blade member slidable transversely to said structure, means for sliding said blade member forward during the rotations of the rotary structure, whereby during the upward movement of the forward part of the blade member, said forward part will project for the taking and upward and rearward carrying of material, and a chute at the rear of the rotary structure, substantially as described.

3. In a conveyor structure for machines of the nature described, the combination of means on said structure for conducting material rearward lengthwise on said structure, a rotary structure located at the forward end of the conveyor structure and including a blade member slidable transversely to said structure, and said slide member and an adjacent relatively stationary part of the rotary structure being tongued and grooved, and means for sliding said blade member forward during the rotations of the rotary structure, whereby during the upward movement of the forward part of the blade member, said forward part will project for the taking and upward and rearward carrying of material, substantially as described.

4. In a conveyor structure for machines of the nature described, the combination of means on said structure for conducting material rearward lengthwise on said structure, a rotary structure located at the forward end of the conveyor structure and including a blade member slidable transversely to said structure, and said slide member and an adjacent relatively stationary part of the rotary structure being tongued and grooved, means for sliding said blade member forward during the rotations of the rotary structure, whereby during the upward movement of the forward part of the blade member, said forward part will project for the taking and upward and rearward carrying of material, and a chute at the rear of the rotary structure, substantially as described.

5. In a conveyor structure for machines of the nature described, the combination of means on said structure for conducting material rearward lengthwise on the structure, a rotary structure located at the forward end of the conveyor structure and including a blade member slidable transversely to the axis of the rotary structure and parallel to a plane in which said axis lies, and means for sliding said blade member forward while the forward edge of said blade member is moving upward, whereby during the upward movement of the forward part of the blade member said forward part will project forward for the taking and upward and backward carrying of material, substantially as described.

6. In a conveyor structure for machines of the nature described, the combination of means on said structure for conducting material rearward lengthwise on the structure, a rotary structure located at the forward end of the conveyor structure and including a blade member slidable transversely to the axis of the rotary structure and in a plane in which said axis lies, and means for sliding said blade member forward while the forward edge of said blade member is moving upward, whereby during the upward movement of the forward part of the blade member said forward part will project forward for the taking and upward and backward carrying of material, substantially as described.

7. In a conveyor structure for machines of the nature described, the combination of means on said structure for conducting material rearward lengthwise on the structure, a rotary structure located at the forward end of the conveyor structure and including a blade member slidable transversely to the axis of the rotary structure and parallel to a plane in which said axis lies, means for sliding said blade member forward while the forward edge of said blade member is moving upward, whereby during the upward movement of the forward part of the blade member said forward part will project forward for the taking and upward and backward carrying of material, and a chute at the rear of the rotary structure, substantially as described.

8. In a conveyor structure for machines of the nature described, the combination of means on said structure for conducting material rearward lengthwise on the structure, a rotary structure located at the forward end of the conveyor structure and including a blade member slidable transversely to the axis of the rotary structure and in a plane in which said axis lies, means for sliding said blade member forward while the forward edge of said blade member is moving upward, whereby during the upward movement of the forward part of the blade member said forward part will project forward for the taking and upward and backward carrying of material, and a chute at the rear of the rotary structure, substantially as described.

9. In a conveyor structure for machines of the nature described, the combination of means on said structure for conducting material rearward lengthwise on the structure, a rotary structure located at the forward end of the conveyor structure and comprising a rigid slotted body and a blade member slidable transversely in said body, and means for sliding said blade member during the rotation of the rotary structure, substantially as described.

10. In a conveyor structure for machines of the nature described, the combination of means on said structure for conducting material rearward lengthwise on the structure, a rotary structure located at the forward end of the conveyor structure and comprising a rigid slotted body and a blade member slidable transversely in said body, and means for sliding said blade member during the rotation of the rotary structure, said body and said blade member being tongued and grooved transversely for confining said blade member to transverse movement, substantially as described.

11. In a conveyor structure for machines of the nature described, the combination of means on said structure for conducting material rearward lengthwise on the structure, side plates having cam faces, a rotary structure located at the forward end of the conveyor structure and comprising a rigid slotted body and a blade member slidable transversely in said body and in engagement with said cam faces for sliding said blade member during the rotation of the rotary structure, substantially as described.

12. In a conveyor structure for machines of the nature described, the combination of means on said structure for conducting material rearward lengthwise on the structure, side plates having cam faces, a rotary structure located at the forward end of the conveyor structure and comprising a rigid slotted body and a blade member slidable transversely in said body and in engagement with said cam faces for sliding said blade member during the rotation of the rotary structure, said body and said blade member being tongued and grooved transversely for confining said slide member to transverse movement, substantially as described.

13. In a conveyor structure for machines of the nature described, the combination of means on said structure for conducting material rearward lengthwise on the structure, a rotary structure located at the forward end of the conveyor structure and comprising a rigid slotted body and a blade member slidable transversely in said body, means for sliding said blade member during the rotation of the rotary structure, and a chute at the rear of the rotary structure, substantially as described.

14. In a conveyor structure for machines of the nature described, the combination of means on said structure for conducting material rearward lengthwise on the structure, a rotary structure located at the forward end of the conveyor structure and comprising a rigid slotted body and a blade member slidable transversely in said body, means for sliding said blade member during the rotation of the rotary structure, said body and said blade member being tongued and grooved transversely for confining said blade member to transverse movement, and a chute at the rear of the rotary structure, substantially as described.

15. In a conveyor structure for machines of the nature described, the combination of means on said structure for conducting material rearward lengthwise on the structure, side plates having cam faces, a rotary structure located at the forward end of the conveyor structure and comprising a rigid slotted body and a blade member slidable transversely in said body and in engagement with said cam faces for sliding said blade member during the rotation of the rotary structure, and a chute at the rear of the rotary structure, substantially as described.

16. In a conveyor structure for machines of the nature described, the combination of means on said structure for conducting material rearward lengthwise on the structure, side plates having cam faces, a rotary structure located at the forward end of the conveyor structure and comprising a rigid slotted body and a blade member slidable transversely in said body and in engagement with said cam faces for sliding said blade member during the rotation of the rotary structure, said body and said blade member being tongued and grooved transversely for confining said slide member to transverse movement, and a chute at the rear of the rotary structure, substantially as described.

17. In a conveyor structure for machines of the nature described, the combination of means on said structure for conducting material rearward lengthwise on the structure, a rotary structure located at the forward end of the conveyor structure and comprising a rigid slotted body and a blade member slidable transversely in said body, means for sliding said blade member during the rotation of the rotary structure, and a chute and a floating plate at the rear of the rotary structure, substantially as described.

18. In a conveyor structure for machines of the nature described, the combination of means on said structure for conducting material rearward lengthwise on the structure, a rotary structure located at the forward end of the conveyor structure and comprising a rigid slotted body and a blade member slidable transversely in said body, means for sliding said blade member during the rotation of the rotary structure, said body and said blade member being tongued and grooved transversely for confining said blade member to transverse movement, and a chute and a floating plate at the rear of the rotary structure, substantially as described.

19. In a conveyor structure for machines of the nature described, the combination of means on said structure for conducting material rearward lengthwise on the structure, side plates having cam faces, a rotary structure located at the forward end of the conveyor structure and comprising a rigid slotted body and a blade member slidable transversely in said body and in engagement with said cam faces for sliding said blade member during the rotation of the rotary structure, and a chute and a floating plate at the rear of the rotary structure, substantially as described.

20. In a conveyor structure for machines of the nature described, the combination of means on said structure for conducting material rearward lengthwise on the structure, side plates having cam faces, a rotary structure located at the forward end of the conveyor structure and comprising a rigid slotted body and a blade member slidable transversely in said body and in engagement with said cam faces for sliding said blade member during the rotation of the rotary structure, said body and said blade member being tongued and grooved transversely for confining said slide member to transverse movement, and a chute and a floating plate at the rear of the rotary structure, substantially as described.

21. In a conveyor structure for machines of the nature described, the combination of means on said structure for conducting material rearward lengthwise on the structure, cam members at the forward end of said structure, a rotary structure located at the forward end of the conveyor structure and comprising a rigid slotted body and a blade member slidable transversely in said body and being in engagement with said cam members to compel the sliding of the blade member during the rotation of the rotary structure, substantially as described.

22. In a conveyor structure for machines of the nature described, the combination of means on said structure for conducting material rearward lengthwise on the structure, cam members at the forward end of said structure, a rotary structure located at the forward end of the conveyor structure and comprising a rigid slotted body and a blade member slidable transversely in said body and being in engagement with said cam members to compel the sliding of the blade member during the rotation of the rotary structure and said blade member being tongued and grooved transversely for confining said slide member to transverse movement, substantially as described.

23. In a conveyor structure for machines of the nature described, the combination of means on said structure for conducting material rearward lengthwise on the structure, side plates located at the forward end of said structure and having bearings, a rotary structure supported in said bearings and comprising a rigid slotted body and a blade member slidable transversely in said body, and means on said side plates for sliding said blade member during the rotation of the rotary structure, substantially as described.

24. In a conveyor structure for machines of the nature described, the combination of means on said structure for conducting material rearward lengthwise on the structure, side plates located at the forward end of said structure and having bearings, a rotary structure supported in said bearings and comprising a rigid slotted body and a blade member slidable transversely in said body, means on said side plates for sliding said blade member during the rotation of the rotary structure, and said body and said blade member being tongued and grooved transversely for confining said slide member to transverse movement, substantially as described.

25. In a conveyor structure for machines of the nature described, the combination of means on said structure for conducting material rearward lengthwise on the structure, side plates located at the forward end of said structure and having cam faces and bearings, a rotary structure supported in said bearings and comprising a rigid slotted body and a blade member slidable transversely in said body and in engagement with said cam faces for sliding said blade member during the rotation of the rotary structure, substantially as described.

26. In a conveyor structure for machines of the nature described, the combination of means on said structure for conducting material rearward lengthwise on the structure, side plates located at the forward end of said structure and having cam faces and bearings, a rotary structure supported in said bearings and comprising a rigid slotted body and a blade member slidable transversely in said body and in engagement with said cam faces for sliding said blade member during the rotation of the rotary structure, and said body and said blade member being tongued and grooved transversely for confining said slide member to transverse movement, substantially as described.

27. In a conveyor structure for machines of the nature described, the combination of means on said structure for conducting material rearward lengthwise on the structure, a rotary structure located at the forward end of the conveyor structure and comprising end members and longitudinal members separated from each other and a blade member slidable transversely between said longitudinal members, and means for sliding said blade member during the rotation of the rotary structure, substantially as described.

28. In a conveyor structure for machines of the nature described, the combination of means on said structure for conducting material rearward lengthwise on the structure, a rotary structure located at the forward end of the conveyor structure and comprising end members and longitudinal members separated from each other and a blade member slidable transversely between said longitudinal members, means for sliding said blade member during the rotation of the rotary structure, said blade member and one of said longitudinal members being tongued and grooved transversely, substantially as described.

29. In a conveyor structure for machines of the nature described, the combination of means on said structure for conducting material rearward lengthwise on the structure, side plates having cam faces, a rotary structure located at the forward end of the conveyor structure and comprising end members and longitudinal members separated from each other and a blade member slidable transversely between said longitudinal members and in engagement with said cam faces for sliding said blade member during the rotation of the rotary structure, substantially as described.

30. In a conveyor structure for machines of the nature described, the combination of means on said structure for conducting material rearward lengthwise on the structure, side plates having cam faces, a rotary structure located at the forward end of the conveyor structure and comprising end members and longitudinal members separated from each other and a blade member slidable transversely between said longitudinal members, means for sliding said blade member during the rotation of the rotary structure, said blade member and one of said longitudinal members being tongued and grooved transversely, substantially as described.

31. In a conveyor structure for machines of the nature described, the combination of means on said structure for conducting material rearward lengthwise on the structure, a rotary structure located at the forward end of the conveyor structure and comprising a rigid slotted body and a blade member slidable transversely in said body and comprising plates and bars, and means for sliding said blade member during the rotation of the rotary structure, substantially as described.

32. In a conveyor structure for machines of the nature described, the combination of means on said structure for conducting material rearward lengthwise on the structure, side plates located at the forward end of the conveyor structure and having cam faces, a rotary structure comprising a rigid slotted body and a blade member slidable transversely in said body and comprising plates and bars and arranged in engagement with said cam faces for sliding said blade member during the rotation of the rotary structure, substantially as described.

33. In a conveyor structure for machines of the nature described, the combination of means on said structure for conducting material rearward lengthwise on the structure, a rotary structure located at the forward end of the conveyor structure and comprising end members and longitudinal members and a blade member slidable transversely in the rotary structure and comprising plates and bars, and means for sliding said blade member during the rotation of the rotary structure, substantially as described.

34. In a conveyor structure for machines of the nature described, the combination of means on said structure for conducting material rearward lengthwise on the structure, cam members located at the forward end of the conveyor structure, a rotary structure comprising a rigid slotted body and a blade member slidable transversely in said body and comprising plates and bars, said bars forming engagement with said cam members for sliding said blade member during the rotation of the rotary structure, substantially as described.

35. In a conveyor structure for machines of the nature described, the combination of means on said structure for conducting material rearward lengthwise on the structure, cam members located at the front end of the conveyor structure, a rotary structure including end members radially slotted at opposite sides of the rotary structure axis and a blade member slidable transversely to said axis and having wrists extending through the slots of the end members into engagement with the cam members for sliding the blade member during the rotation of the rotary structure, substantially as described.

In testimony whereof I have signed my name this 31st day of July, in the year one thousand nine hundred and twenty-three.

FRED OLDROYD.